2,904,665

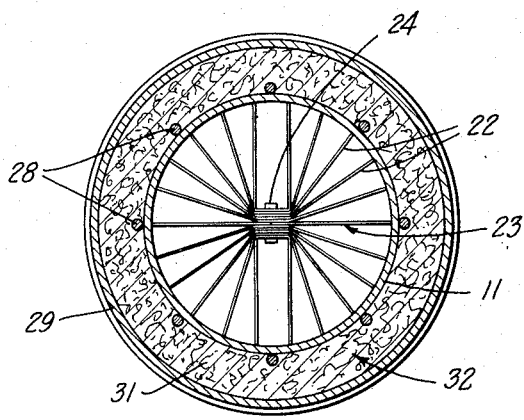
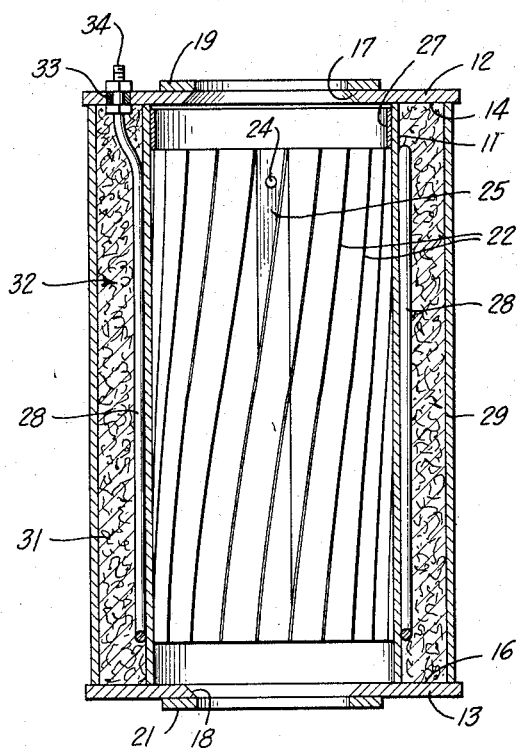
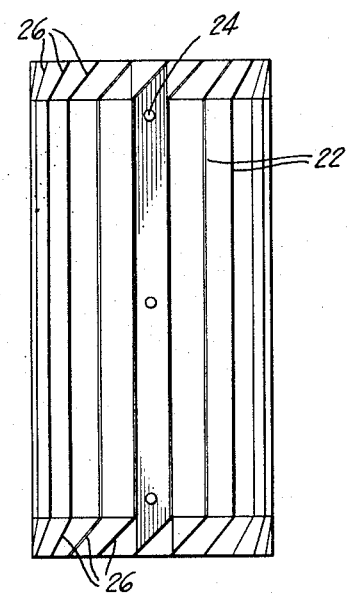
INVENTOR.
Hayden S. Gordon
BY
William D. Hager
ATTORNEY United States Patent Office 2,904,665
Patented Sept. 15, 1959

VACUUM TRAP

Hayden S. Gordon, Lafayette, Calif., assignor to Applied Radiation Corporation, Walnut Creek, Calif., a corporation of California Application June 18, 1957, Serial No. 666,341

10 Claims. (Cl. 219—19)

The present invention relates to traps for use in vacuum systems, and more particularly, to an improved adsorption vacuum trap.

In high vacuum systems it is necessary that any condensible impurities present in a vessel undergoing evacuation be removed since the vapor pressure of such impurities is appreciable and thereby seriuosly limits the ultimate obtainable vacuum in the system. Moreover in vacuum vessels in which high voltage electrical apparatus is contained, e.g., the charged particle acceleration region of an electrostatic particle accelerator, it is important that the inside surfaces of insulators and the like be not contaminated by impurities whereby spark breakdown paths would be formed.

Accordingly, to exhaust a vessel to very low pressures as well as to rid the vessel of condensible gaseous impurities, it is common practice to bake out the vessel at high temperatures to evolve any gases adsorbed (as surface layers) on the walls of the vessel or metal structures disposed therein. Such gases are thereby able to pass freely to the pumps during exhaustion. In the absence of suitable means for removing condensible impurities from the gaseous material exhausted from the vessel, an appreciable back pressure is established in the pumps and thereby seriously limits the ultimate obtainable vacuum in the vessel. Therefore, a vacuum trap is conventionally inserted in the exhaust line between the vessel and the pumps. Furthermore, inasmuch as mercury or oil diffusion pumps are extensively employed in high vacuum systems and such pumps act as sources rather than sinks for condensible contaminants at the extremely low pressures involved, the vacuum trap is additionally required in the system to isolate the vacuum vessel from the by-products of the diffusion pumps.

Heretofore in the art, vacuum traps have generally comprised a vacuum jacket adapted for insertion in an exhaust line and having condensing walls upon which the condensible impurities are trapped in transit to the pumps. The condensing walls are commonly obtained by the provision of a suitable liquid refrigerant, e.g., liquid air or liquid nitrogen, in contact with the jacket. Cold traps of the foregoing type are variously disadvantageous, however, in that re-evaporation of the condensed gases occurs when the level of the refrigerant is lowered. Furthermore, since heat transfer in a vacuum is almost exclusively by radiation, conventional vacuum traps of the above as well as other known types, do not come to thermal equilibrium quickly nor maintain very uniform temperatures.

The present invention overcomes the foregoing inadequacies and limitations by providing an improved vacuum trap having a plurality of adsorption surfaces disposed within a vacuum jacket and which depends upon direct metallic conduction from the walls of the jacket to the central axial regions thereby enclosed for its operation. More particularly, the improved vacuum trap comprises generally a vacuum jacket having inlet and outlet means communicating with the interior thereof for connection to a vacuum system. A plurality of metallic fins are disposed within the jacket and extend from the walls to the central axis thereof and heating means are provided for periodically heating the fins to condition same for adsorption. Heat may be thus conducted through the fins from the walls to the center of the jacket with negligible temperature gradient to obtain a uniform temperature at the fin surfaces.

It is therefore a primary object of the present invention to provide an improved adsorption vacuum trap capable of maintaining a uniform temperature at the adsorption surface in a vacuum.

It is another object of the invention to provide an improved vacuum trap which is capable of attaining an equilibrium temperature rapidly.

Still another object of the present invention is the provision of a vacuum trap which depends upon metallic thermal conduction for its operation.

One other object is to provide a vacuum trap having a large adsorption surface.

It is a further object of the invention to provide an improved adsorption baffle assembly for use in vacuum traps and the like.

A still further object of the invention is the provision of a highly efficient vacuum trap which is capable of removing substantially all condensible impurities from a permanent gas in a vacuum system at room temperature.

The present invention together with further objects and advantages thereof will be better understood by reference to the following description taken in conjunction with the accompanying drawing wherein the invention and mode of operation thereof is described and illustrated with respect to specific embodiments in the interest of clarity, however, no limitations are intended or to be inferred therefrom, reference being made to the appended claims for a precise delineation of the scope of the invention.

In the accompanying drawing:

Figure 1 is a plan sectional view of a preferred embodiment of the present invention, Figure 2 is a partially broken out elevation view of this embodiment illustrating internal structural details thereof, and Figure 3 is an elevation view of an alternate baffle assembly for use in the embodiment of Figures 1 and 2.

Referring now to the drawing and particularly to Figures 1 and 2, there is shown the improved vacuum trap of the present invention which generally comprises a vacuum jacket having inlet and outlet means adapted for pressure sealed attachment to a vacuum system, as for example, between a vacuum vessel and the inlet port of a diffusion pump. A plurality of axially elongated metallic fins are disposed within the jacket and each extends from the inner wall surface to the axis thereof preferably in a radial array. Heating means are provided for periodically heating the fins to elevated temperatures to condition same for vacuum service.

More particularly there is provided a cylindrical inner jacket 11 which is fabricated from a good thermally conducting adsorption material, e.g., copper.

The jacket is closed as by means of closure disks 12, 13 transversely attached in pressure sealed relationship to the end extremities of the jacket and extending outward from the periphery thereof to form salient annular flanges 14, 16 with jacket 11.

Disks 12, 13 are provided with central axial apertures 17, 18 respectively and annular shoulder flanges 19, 21 adapted for pressure sealed attachment to a vacuum system are coaxially attached to the exterior faces of disks 12, 13, respectively, to facilitate preferred inlet and outlet structure to the interior of jacket 11.

There is provided within jacket 11 a plurality of flat axially elongated metallic adsorption fins 22 extending from the inner wall surface of the jacket to the central axis thereof preferably in a radial array. Preferred structure for facilitating the foregoing comprises an assembly of axially elongated baffle plates 23 each having a width equal to substantially twice the radial width of fins 22. Plates 23 are fabricated from a good thermally conducting material, such as, copper, which has an affinity for free molecules by adsorption.

Plates 23 are stacked and rigidly joined along the central longitudinal axes thereof by means of suitable fasteners 24, e.g., rivets. Longitudinal half sections of each plate 23 are inclined from a central narrow axial strip section 25 in a radial array whereby each half section comprises a fin 22.

One other structural configuration for the provision of radial array of fins may be accomplished by providing a pair of flat axially elongated plates which are engaged at right angles as by means of central axial slots. Such plates are rigidly connected at the axis, preferably by hard soldering, to provide four centrally joined fins having right angle separation. A plurality of axially elongated fins having widths equal to half the widths, respectively, of the foregoing plates are radially disposed within the quadrants partitioned by such plates and right angle flanges are turned at the edges of the fins to maintain uniform fin separation. To facilitate rigid attachment of the fins in the radial array thus provided, a disk is soldered transversely to each end extremity of the array coaxial therewith.

In order that substantially all gas molecules in passing through jacket 11 will impinge upon the surface of a fin 22, it is desirable that line-of-sight optical paths longitudinally through the radial fin array be obstructed by appropriate deformation of the fins. The foregoing is best accomplished as illustrated in Figures 1 and 2 wherein the radial array of fins 22 are torsionally deformed with respect to the longitudinal axis thereof, i.e., the ends of the array of fins are circumferentially twisted in opposite directions whereby fins 22 describe slight spirals with reference to the longitudinal axis of the fin array to thereby obstruct any direct longitudinal paths therethrough.

Optical paths through the radial array of fins 22 may also be blocked by deforming same as illustrated in the alternate baffle assembly of Figure 3. As shown therein, flanges 26 are turned circumferentially in opposite directions respectively at the ends of each fin 22. Flanges 26 are each turned through an angle less than 90° which is dependent upon the flange width and circumferential fin spacing such that the edge of each flange overlaps the next adjacent fin 22 to thereby block longitudinal paths through the array.

The radial array of fins 22 of either of the embodiments hereinbefore described may be freely disposed coaxially within jacket 11 or in the event a more rugged trap assembly is desired, the array may be rigidly attached to the inner wall surface of jacket 11, as by hard soldering the peripheral edges of fins 22 thereto. More preferably, an annular support ring 27 is secured concentrically to the peripheral edge surfaces of fins 22, as by hard soldering, and ring 27 is in turn rigidly attached to the inner wall surface of jacket 11.

Fins 22 are periodically heated to an elevated temperature to condition the surfaces thereof for adsorption and such heating may be accomplished by any one of several appropriate heating means or methods which are well known in the art, as for example by embedded heaters, direct electrical resistance heating, high frequency induction heating, and the like. Preferred heating means, however, comprise a plurality of series connected axially elongated heating elements 28 rigidly attached to the outer periphery of jacket 11. Heating elements 28 are preferably exteriorly encompassed by suitable thermal insulating means whereby heat will be preferentially transferred from the elements inwardly to jacket 11. Accordingly a cylindrical outer jacket 29 is attached at its end extremities to annular flanges 14, 16 respectively, concentric with reference to inner jacket 11 and the annular space 31 thus formed between inner and outer jackets 11, 29, respectively, is filled with a suitable thermal insulating material 32, e.g., asbestos, rock wool, or the like.

To facilitate energization of heating elements 28, terminal means adapted for connection to a source of electric current are provided connected to the end extremities of the series connected combination of such elements and leading exteriorly from annular space 31, as through insulated bores in outer jacket 29. More preferably, the end extremities of heating elements 28 are led exteriorly through conventional insulated feed through bushings 33 mounted in closure disk 12 to terminate thereat in suitable input terminals 34.

With the improved vacuum trap of the present invention constructed as illustrated in the accompanying drawing and hereinbefore described, the trap is conventionally connected in a vacuum system between a vessel undergoing evacuation and the pumps effecting same as by pressure sealed attachment of flange 19 to the exhaust line from the vessel and flange 21 to the inlet port of the pumps.

To prepare the trap for operation, a large area of "clean" metal surface is provided by vacuum out-gassing of the surfaces of fins 22. To facilitate the foregoing, the trap is held under vacuum by the pumps of the vacuum system in which the trap is connected. Terminals 34 are connected to a source of electric current to thereby effect heating of inner jacket 11 to an elevated temperature by heating elements 28. Heat is rapidly transferred inwardly from jacket 11 to the center of the trap through fins 22 by direct metallic conduction whereby the inner surface portions of fins 22 quickly reach a temperature that is substantially the same as that at the peripheral surface portions thereof as well as the inner wall surface of jacket 11. Any gases absorbed on the foregoing surfaces of the trap are consequently evolved and exhausted to the pumps through aperture 18. Heat is applied to jacket 11 for a time sufficiently long to release all of the adsorbed gas from the fin surfaces. At this point it is important to note that since the entire surface of each fin 22 and the interior surface of jacket 11 are at substantially the same temperature in the trap of the present invention, there is no tendency during outgassing for condensible gases to be driven from hot portions of the trap to cooler areas where recondensation would occur.

After outgassing of the interior of the trap, the source of electric current is removed from terminals 34 and the trap is permitted to cool to a uniform low temperature (room temperature) for vacuum service. Because of the foregoing outgassing conditioning process, unsatisfied surface valence bonds are provided at the surfaces of fins 22 and interior of jacket 11 and such surfaces have an affinity for condensible (free) gas molecules due to adsorption phenomena, even at room temperature.

Accordingly, in operation gas molecules exhausted from the vacuum vessel undergoing evacuation, in passing through the trap in transit to the pumps, impinge upon the "clean" metallic surfaces of fins 22 and jacket 11. Any condensible impurities in the gaseous exhaust material are consequently adsorbed at the "clean" metal surfaces upon contact therewith and are prevented from reaching the pumps. Since line-of-sight passage through the trap is prevented by the torsionally deformed array of fins 22 in the embodiment of Figures 1 and 2, or alternatively, by flanged end extremities 26 of fins 22 in the embodiment of Figure 3, substantially all of the exhausted gas molecules impinge upon the adsorption surfaces of fins 22. Condensible impurities are therefore trapped with extreme efficiency at the fin surfaces. It is to be noted that the trap of the present invention is particularly advantageous in that trapping by adsorption therein occurs very satisfactorily at room temperature without the necessity of cooling. The provision of suitable means for cooling jacket 11 and fins 22, however, enhances the adsorption effectiveness of the trap. The trap may be cooled as by providing cooling coils interleaved between heating elements 26 in intimate contact with the exterior of jacket 11 and carrying a suitable refrigerant such as liquid air, liquid nitrogen, or the like. Other appropriate cooling means will be apparent to those skilled in the high vacuum art.

It will be appreciated that after the trap of the present invention has been in extended operation, the surfaces of fins 22 and the interior surfaces of jacket 11 become loaded with adsorbed gas thereby reducing the effectiveness of the trap. Accordingly the trap is commonly periodically regenerated by vacuum outgassing in the manner hereinbefore described in regard to the initial conditioning of fins 22 and jacket 11 for adsorption, i.e., by applying current to heating elements 28 whereby the gas adsorbed on the surfaces of jacket 11 and fins 22 is evolved and exhausted by the pumps of the vacuum system. The period of time between successive bake-outs of the trap depends upon the rate of contamination within the vacuum system in which the trap is employed and may vary from periods of days to several weeks. As regard the length of the regenerating cycle of the trap, it will be appreciated that such cycle depends upon the time required for the surfaces of fins 22 to reach an elevated temperature for outgassing, plus the time such temperature is maintained to accomplish such outgassing, plus the time required for the fins to cool down to a uniform low temperature for vacuum service. It is therefore readily apparent that the trap of the present invention is particularly advantageous in that the regeneration cycle of same is comparatively short, the transfer of heat in the trap during such cycle being most rapidly accomplished by conduction through paths of high thermal conductivity as provided by the radial array of fins 22.

There has been described hereinbefore an improved vacuum trap which has been illustrated and describe in connection with but some of many possible embodiments and with respect to specific structure and mode of operation, however, same are to be taken only as examples and in no way limiting upon the scope of the invention which is precisely delineated in the following claims.

What is claimed is:

1. An improved vacuum trap comprising a vacuum jacket, said jacket having inlet and outlet means adapted for connection to a vacuum system, a plurality of axially elongated metallic adsorption fins radially disposed within said jacket and continuously joined at the longitudinal axis thereof, said fins deformed to block line-of-sight paths longitudinally through said jacket, and heating means carried by said jacket for periodically heating same to elevated temperatures whereby heat is transferred from said jacket inwardly through said fins with negligible temperature gradient.

2. An improved vacuum trap comprising a closed cylindrical vacuum jacket having inlet and outlet means at the end extremities thereof respectively, a radial array of continuously axially joined metallic adsorption fins disposed coaxially within said jacket, said fins torsionally deformed to block optical paths longitudinally through said jacket, and heating means for periodically heating said fins to elevated temperatures.

3. An improved vacuum trap comprising a closed cylindrical vacuum jacket having inlet and outlet means at the end extremities thereof respectively, a radial array of metallic adsorption fins disposed coaxially within said jacket and continuously joined at the longitudinal axis thereof, each one of said fins having circumferentially turned flanges at the end extremities thereof overlapping respectively adjacent fins to obstruct optical paths longitudinally through said array, and heating means for periodically heating said fins.

4. An improved vacuum trap comprising a closed cylindrical vacuum jacket having inlet and outlet means at the end extremities thereof, a radial array of metallic adsorption fins coaxially disposed within said jacket with edge surfaces of the fins in continuous joinder along the longitudinal axis of the jacket, said array torsionally deformed to obstruct longitudinal optical paths therethrough, a plurality of electric heating elements carried by said jacket, terminal means connected to said heating elements and adapted for connection to a source of electrical current, and thermal insulating means encompassing said jacket whereby heat is transferred from said elements preferentially radially inward through said jacket and said fins with negligible temperature gradient.

5. An improved vacuum trap comprising a metallic cylindrical inner jacket, closure disks transversely attached in pressure sealed relationship to the end extremities of said jacket and forming salient annular flanges therewith, said disks each having a central axial aperture therethrough, inlet and outlet means adapted for pressure sealed connection to a vacuum system carried by said disks respectively and communicating with said apertures, a radial array of axially continuously joined elongated metallic adsorption fins disposed coaxially within said jacket, said fins deformed to obstruct longitudinal optical paths therethrough, an outer cylindrical jacket transversely attached to said salient flanges concentric to said inner jacket and forming an annular space therewith, a plurality of circumferentially spaced electric heating elements attached to the exterior of said inner jacket, terminal means connected to said elements leading exteriorly from said annular space for connection to a source of electric current, and thermal insulating material disposed between said inner and outer jackets within said annular space.

6. An improved vacuum trap as defined by claim 5 but wherein said adsorption fins comprise a plurality of axially elongated metallic baffle plates having widths substantially equal the inner diameter of said inner jacket, said plates continuously attached in stacked relationship along the longitudinal axis thereof and inclined from said axis in a radial array, said plates torsionally deformed circumferentially about said axis to obstruct longitudinal optical paths therethrough.

7. An improved vacuum trap as defined by claim 5 but wherein said adsorption fins comprise a plurality of axially elongated metallic baffle plates having widths substantially equal the inner diameter of said inner jacket, said plates continuously attached in stacked relationship along the longitudinal axis thereof and inclined from said axis in a radial array, said plates having circumferential flanges turned in opposite directions at the end extremities thereof overlapping respectively adjacent plates to obstruct optical paths longitudinally through said array.

8. An improved baffle assembly for internal employment in a cylindrical vacuum trap comprising a radial array of axially elongated metallic adsorption fins having widths substantially equal to the inner radius of said trap with the fins in continuous joinder along the longitudinal axis of the array, said fins circumferentially deformed to obstruct longitudinal line-of-sight paths therethrough.

9. An improved baffle assembly for internal employment in a cylindrical vacuum trap comprising a plurality of axially elongated metallic adsorption baffle plates having widths substantially equal to the inner diameter of said trap, said plates continuously rigidly attached in stacked relationship along the longitudinal axis thereof and inclined from said axis in a radial array, said fins torsionally deformed circumferentially about axis to obstruct longitudinal optical paths therethrough.

10. An improved baffle assembly for internal employment in a cylindrical vacuum trap comprising a plurality of axially elongated metallic adsorption baffle plates having widths substantially equal to the inner diameter of said trap, said plates continuously attached in stacked relationship along the longitudinal axis thereof and inclined from said axis in a radial array, said plates having circumferential flanges turned in opposite directions at the end extremities thereof respectively overlapping adjacent plates to obstruct longitudinal optical paths through said array.

References Cited in the file of this patent

UNITED STATES PATENTS

| Number | Name | Date |
|---|---|---|
| 474,797 | Mitchell | May 10, 1892 |
| 732,489 | Wood | June 30, 1903 |
| 1,709,745 | Schroers | Apr. 16, 1929 |
| 1,841,332 | Kranz | Jan. 12, 1932 |
| 2,374,609 | McCollum | Apr. 24, 1945 |
| 2,391,382 | Bilan | Dec. 25, 1945 |
| 2,434,519 | Raskin | Jan. 13, 1948 |
| 2,464,703 | Marshal | Mar. 15, 1949 |
| 2,510,456 | Biebel | June 6, 1950 |
| 2,659,392 | Frenkel | Nov. 17, 1953 |
| 2,726,681 | Gaddis et al. | Dec. 13, 1955 |
| 2,808,980 | Alpert | Oct. 8, 1957 |
| 2,858,972 | Gurewitsch | Nov. 4, 1958 |